(12) United States Patent
Sung et al.

(10) Patent No.: US 10,876,980 B2
(45) Date of Patent: Dec. 29, 2020

(54) ANALYSIS APPARATUS INTERLOCKING IN-SITU X-RAY DIFFRACTION AND POTENTIOSTAT AND ANALYZING METHODS USING THE SAME

(71) Applicant: The Industry & Academic Cooperation In Chungnam National University (IAC), Daejeon (KR)

(72) Inventors: Yung-Eun Sung, Seoul (KR); Jungjin Park, Seoul (KR); Chunjoong Kim, Daejeon (KR); Jong Sig Lee, Gyeonggi-do (KR); Jae-Hyuk Park, Incheon (KR)

(73) Assignee: THE INDUSTRY & ACADEMIC COOPERATION IN CHUNGNAM NATIONAL UNIVERSITY (IAC), Daejeon (KR)

(*) Notice: Subject to any disclaimer, the term of this patent is extended or adjusted under 35 U.S.C. 154(b) by 20 days.

(21) Appl. No.: 16/263,495

(22) Filed: Jan. 31, 2019

(65) Prior Publication Data
US 2019/0250112 A1 Aug. 15, 2019

(30) Foreign Application Priority Data
Jan. 31, 2018 (KR) .................. 10-2018-0012444

(51) Int. Cl.
*G01N 23/207* (2018.01)
*G01N 23/20025* (2018.01)

(52) U.S. Cl.
CPC ..... *G01N 23/207* (2013.01); *G01N 23/20025* (2013.01); *G01N 2223/60* (2013.01)

(58) Field of Classification Search
CPC ....... G01N 2223/306; G01N 23/20025; G01N 23/207; G01N 23/20
See application file for complete search history.

(56) References Cited

U.S. PATENT DOCUMENTS

2014/0093052 A1* 4/2014 Chupas .......... G01N 23/20025
378/208
2014/0270080 A1* 9/2014 El-Dasher .......... G01N 23/201
378/86

FOREIGN PATENT DOCUMENTS

JP 2001-337068 A 12/2001
KR 10-2008-0012438 A 2/2008

OTHER PUBLICATIONS

Sungun Wi, Jungjin Park, Sangheon Lee, Jaewon Kim, Bumjin Gil, Alan Jiwan Yun, Yung-Eun Sung, Byungwoo Park, Chunjoong Kim entitled, "Insights on the delithiation/lithiation reactions of LixMn0.8Fe0.2PO4 mesocrystals in Li+ batteries by in situ techniques," Nano Energy 39 (2017) 371-379, Elsevier (http://dx.doi.org/10.1016/j.nanoen.2017.07.016, Received Apr. 12, 2017; Received in revised form Jun. 14, 2017; Accepted Jul. 9, 2017). 9 pages.

* cited by examiner

Primary Examiner — Chih-Cheng Kao
(74) Attorney, Agent, or Firm — Burris Law, PLLC (57) ABSTRACT

Provided is an in-situ X-ray analysis apparatus including a potentiostat connected to an in-situ electrochemical cell and configured to adjust voltage, current, and time of the in-situ electrochemical cell or to record information regarding voltage, current, resistance, capacity, and time information of the in-situ electrochemical cell; an X-ray analysis apparatus configured to obtain X-ray diffraction information regarding the in-situ electrochemical cell; and a controller connected to the X-ray analysis apparatus and the potentiostat and configured to provide or receive signals to or from the X-ray analysis apparatus and the potentiostat.

10 Claims, 9 Drawing Sheets

FIG. 8

ANALYSIS APPARATUS INTERLOCKING IN-SITU X-RAY DIFFRACTION AND POTENTIOSTAT AND ANALYZING METHODS USING THE SAME

STATEMENT OF GOVERNMENTAL SUPPORT

This research was supported by Creative Materials Discovery Program through the National Research Foundation of Korea (NRF) funded by the Ministry of Science, ICT and Future Planning (NRF-2017M3D1A1039561).

CROSS-REFERENCE TO RELATED APPLICATION

This application claims the benefit of Korean Patent Application No. 10-2018-0012444, filed on Jan. 31, 2018, in the Korean Intellectual Property Office, the disclosure of which is incorporated herein in its entirety by reference.

BACKGROUND

1. Field

One or more embodiments relate to an analysis method interlocking an in-situ X-ray diffraction analysis apparatus and a potentiostat, and more particularly, to an analysis method interlocking an in-situ X-ray diffraction analysis apparatus and an electrochemical analysis apparatus in relation to an in-situ electrochemical cell.

2. Description of the Related Art

Recently, as demands for using lithium ion batteries in various fields of application including small mobile devices and electric vehicles increase, there is a need to optimize the performance of lithium ion batteries according to various requirements for various fields of application. Particularly, electrochemical characteristics of new cathode active material candidates and anode active material candidates with high capacity and low cost are actively studied. However, the relationship between phase transition characteristics and electrochemical performance of some of the new cathode active materials and anode active materials due to charging and discharging has not been clarified, and thus performance improvement and commercialization of such candidate materials are difficult.

SUMMARY

One or more embodiments include an in-situ X-ray analysis apparatus capable of precisely analyzing phase transition characteristics of an electrochemical cell due to charging and discharging.

One or more embodiments include an in-situ X-ray analysis method capable of precisely analyzing phase transition characteristics of a material according to voltage, current, capacity, and time during charging and discharging.

Additional aspects will be set forth in part in the description which follows and, in part, will be apparent from the description, or may be learned by practice of the presented embodiments.

According to one or more embodiments, an in-situ X-ray analysis apparatus includes a potentiostat connected to an in-situ electrochemical cell and configured to adjust voltage, current, and time of the in-situ electrochemical cell or to record information regarding voltage, current, resistance, capacity, and time information of the in-situ electrochemical cell; an X-ray analysis device configured to obtain X-ray diffraction information regarding the in-situ electrochemical cell; and a controller connected to the X-ray analysis device and the potentiostat and configured to provide or receive signals to or from the X-ray analysis device and the potentiostat.

According to example embodiments, the potentiostat may be configured to provide the information regarding capacity, voltage, current, and time of the in-situ electrochemical cell to the controller, and the controller may be configured to provides a command signal for the X-ray analysis device to irradiate an X-ray to the in-situ electrochemical cell in response to a signal based on the information provided by the potentiostat.

According to example embodiments, the controller may be configured to derive overpotential information and diffusivity information in each state based on the information regarding capacity, voltage, current, and time of the in-situ electrochemical cell, and the controller may be configured to determine a delay time after which a command signal is provided to the X-ray analysis device according to the overpotential information and the diffusivity information.

According to example embodiments, the delay time may be determined as a time until the overpotential information and the diffusivity information in each state become lower than critical overpotential and critical diffusivity.

According to example embodiments, the X-ray analysis device may be a transmission type X-ray analysis apparatus.

According to example embodiments, the in-situ electrochemical cell may include a cell casing having a plurality of holes capable of transmitting an X-ray irradiated from the X-ray analysis device therethrough into the in-situ electrochemical cell; a positive electrode provided in the cell casing; a negative electrode provided in the cell casing; a separator film interposed between the positive electrode and the negative electrode; and an electrolyte in which at least surfaces of the positive electrode, the negative electrode, and the separator film are soaked.

According to one or more embodiments, an in-situ X-ray analysis method includes obtaining information regarding capacity, voltage, current, and time of an in-situ electrochemical cell through a potentiostat connected to the in-situ electrochemical cell; providing the information regarding capacity, voltage, current, and time of the in-situ electrochemical cell from the potentiostat to a controller; deriving, by the controller, overpotential information and diffusivity information in each state of the in-situ electrochemical cell, based on the information regarding capacity, voltage, current, and time; determining, by the controller, a delay time based on the overpotential information and the diffusivity information; providing a command signal to an X-ray analysis device connected to the controller from the controller after the delay time has elapsed; and irradiating, by the X-ray analysis device, an X-ray to the in-situ electrochemical cell to obtain an X-ray diffraction pattern.

According to example embodiments, the delay time may be determined as a time until the overpotential information and the diffusivity information in each state become lower than critical overpotential and critical diffusivity.

According to example embodiments, the delay time may be determined as a constant value regardless of the overpotential information and the diffusivity information.

According to example embodiments, the in-situ electrochemical cell may include a cathode active material containing $LiMn_xFe_{1-x}PO_4$.

An in-situ X-ray analysis apparatus according to one or more embodiments may include a potentiostat connected to an in-situ electrochemical cell and adjusts voltage and current of an in-situ electrochemical cell, an X-ray analysis device configured to obtain X-ray diffraction information regarding the in-situ electrochemical cell, and a controller connected to the X-ray analysis device and the potentiostat and configured to provide or receive signals to or from the X-ray analysis device and the potentiostat. The controller may determine a delay time according to overpotential information and diffusivity information in each state regarding the electrochemical cell and provide a command signal to the X-ray analysis device after the delay time has elapsed. Therefore, the phase transition characteristics of an electrochemical cell may be precisely analyzed in consideration of the lithium ion reaction speed in the in-situ electrochemical cell.

BRIEF DESCRIPTION OF THE DRAWINGS

These and/or other aspects will become apparent and more readily appreciated from the following description of the embodiments, taken in conjunction with the accompanying drawings in which:

FIG. 7A to 7D show impedance graphs obtained through an in-situ impedance measurement in conjunction with an in-situ X-ray analysis method according to example embodiments, particularly.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In order to fully understand the structure and effects of the present invention, example embodiments will be described with reference to the accompanying drawings. The present invention may, however, be embodied in many different forms and should not be construed as limited to the embodiments set forth herein. It should be understood, however, that the description of the embodiments is provided to enable the disclosure of the present invention to be complete, and will fully convey the scope of the present invention to one of ordinary skill in the art to which the present invention belongs. In the accompanying drawings, elements are enlarged in size for convenience of explanation, and the proportions of the elements may be exaggerated or reduced.

It is to be understood that when an element is described as being "on" or "in contact with" another element, it is to be understood that other elements may directly contact or be directly connected to the other element or intervening element may be present therebetween. On the other hand, when an element is described as being "directly on" or "directly in contact with" another element, it may be understood that there is no other element therebetween. Other expressions that describe relationships between elements, e.g., "between" and "directly between" may be interpreted in the same manner.

While such terms as "first," "second," etc., may be used to describe various elements, such elements must not be limited to the above terms. The above terms may be used only to distinguish one element from another. For example, without departing from the scope of one or more embodiments, a first element may be referred to as a second element, and similarly, a second element may also be referred to as a first element.

An expression used in the singular encompasses the expression of the plural, unless it has a clearly different meaning in the context. It is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The terms used in the embodiments of the present invention may be construed as commonly known to those skilled in the art unless otherwise defined.

Hereinafter, the present invention will be described in detail with reference to the accompanying drawings.

Figure 1:
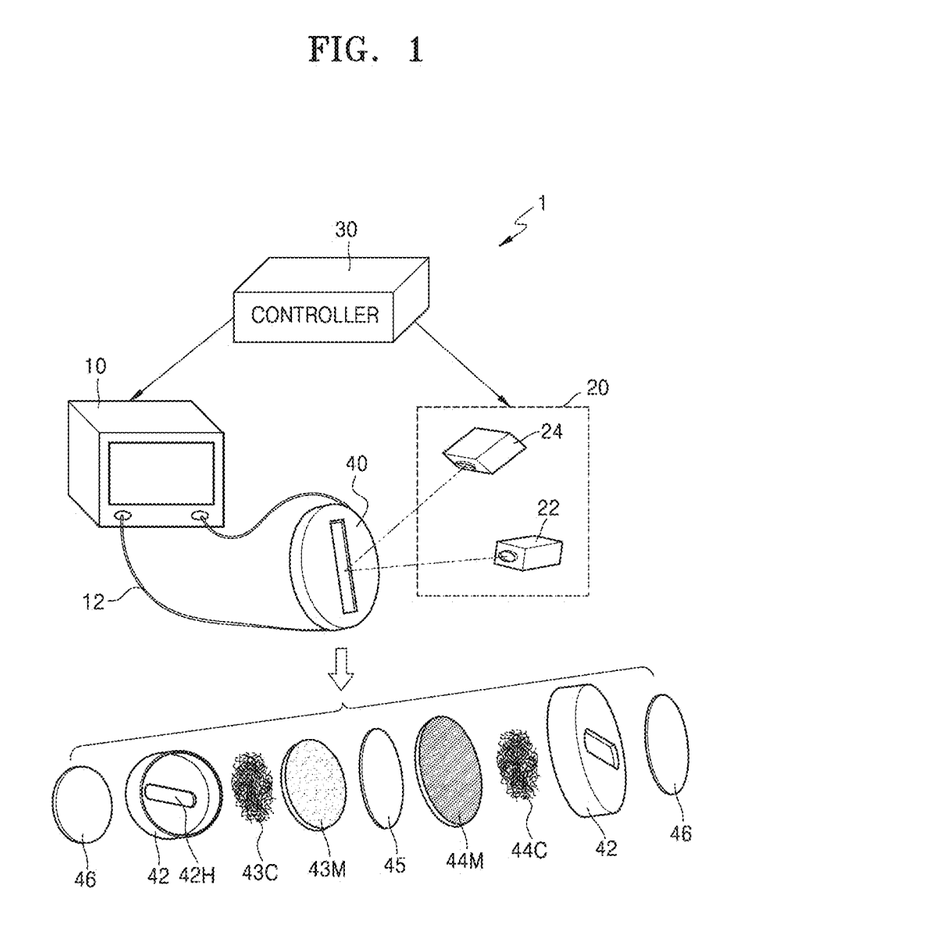
FIG. 1 is a schematic diagram showing a representative configuration of an in-situ X-ray analysis apparatus 1 according to example embodiments.

FIG. 1 is a schematic diagram showing a representative configuration of an in-situ X-ray analysis apparatus 1 according to example embodiments.

Referring to FIG. 1, the in-situ X-ray analysis apparatus 1 may include a potentiostat 10, an X-ray analysis device 20, and a controller 30.

The in-situ X-ray analysis apparatus 1 may include the potentiostat 10 capable of analyzing the electrochemical performance of an in-situ electrochemical cell 40 and an in-situ X-ray analysis device 20 capable of analyzing X-ray diffraction information regarding the in-situ electrochemical cell 40. The controller 30 may be configured to be connected to the potentiostat 10 and the X-ray analysis device 20, receive information from the potentiostat 10 and the X-ray analysis device 20, and provide control signals to the potentiostat 10 and the X-ray analysis device 20.

The potentiostat 10 may be configured to be connected to the in-situ electrochemical cell 40 to regulate a voltage and a current of the in-situ electrochemical cell 40 or to record voltage information and current information regarding the in-situ electrochemical cell 40. The potentiostat 10 may include an input/output terminal 12 connected to a positive terminal and a negative terminal of the in-situ electrochemical cell 40. For example, the potentiostat 10 may provide information regarding capacity, voltage, current, and time of the in-situ electrochemical cell 40 to the controller 30.

The X-ray analysis device 20 may be configured to be connected to the in-situ electrochemical cell 40 to irradiate an X-ray to the in-situ electrochemical cell 40 and detect diffracted light from the in-situ electrochemical cell 40. The X-ray analysis device 20 may include an X-ray irradiation unit 22 and an X-ray detection unit 24. For example, the X-ray analysis device 20 may be configured to receive a command signal from the controller 30, irradiate an X-ray to the in-situ electrochemical cell 40 rays in response to the command signal, and detect diffracted light. In example embodiments, the X-ray analysis device 20 may be a transmissive (or a transmission-type) X-ray analysis apparatus. In other embodiments, the X-ray analysis device 20 may be a reflective X-ray analysis apparatus.

The controller 30 may be electrically connected to the potentiostat 10 and the X-ray analysis device 20. The controller 30 may receive information regarding capacity, voltage, current, and time from potentiostat 10 and provide a command signal to X-ray analysis device 20 in response to a signal based on such information. For example, the controller 30 may be configured to derive overpotential information and diffusivity information in each state based on information regarding capacity, voltage, current, and time provided from the potentiostat 10. Furthermore, the controller 30 may derive a delay time based on the overpotential information and the diffusivity information and may provide a command signal to the X-ray analysis device 20 after the delay time has elapsed. The controller 30 may allow for an X-ray diffraction analysis to be performed in quasi-equilibrium state of the in-situ electrochemical cell 40 by adjusting the delay time according to a reaction speed of the in-situ electrochemical cell 40.

The in-situ electrochemical cell 40 may include a cell casing 42, a positive electrode 43, a negative electrode 44, a separator film 45, a protection member 46, and an electrolyte (not shown).

The cell casing 42 may include at least one hole 42H in a top surface and a bottom surface. An X-ray irradiated from the X-ray analysis device 20 may be transmitted into the in-situ electrochemical cell 40 through the at least one hole 42H of the cell casing 42. In example embodiments, the cell casing 42 may include a coin-type metal casing having a plurality of holes 42H formed in a top surface thereof. However, the shape and the material of the cell casing 42 are not limited thereto. Unlike as shown in FIG. 1, the cell casing 42 may include a rectangular-type metal casing having at least one hole 42H formed in a top surface thereof.

In example embodiments, the protection member 46 may be formed to cover the plurality of holes 42H of the cell casing 42. The protection member 46 may be, for example, a transparent adhesive tape. The protection member 46 may prevent the electrolyte from being leaked to the outside of the cell casing 42.

The positive electrode 43 may include a positive current collector 43C and a positive active material 43M (or a cathode active material). The positive current collector 43C may include a conductive material and may be a thin conductive mesh or a thin conductive foil. For example, the positive active material 43M may include aluminum, nickel, copper, gold, or alloys thereof. The positive active material 43M may include a material capable of reversibly intercalating/deintercalating lithium ions. The positive active material 43M may be an active material needed to analyze phase transition characteristics due to charging and discharging by the potentiostat 10 and the X-ray analysis device 20. In example embodiments, the positive active material 43M may include an olivine-structured lithium phosphate-based positive active material, a vanadium oxide-based positive active material, a layered lithium metal oxide, a spinel-structured lithium manganese oxide-based positive active material, a sulfur-based positive active material, etc. For example, the positive active material 43M may include $LiFePO_4$, $LiMn_xFe_{1-x}PO_4$, $LiFePO_4F$, $V_2O_5$, $LiV_2O_5$, $LiMnO_2$, $LiCoO_2$, $LiNi_xMn_yCo_{1-x-y}O_2$, $LiMn_2O_4$, etc. For example, a result of analyzing electrochemical performance and phase transition characteristics of the in-situ electrochemical cell 40 in which $LiMn_xFe_{1-x}PO_4$ is used as the positive active material 43M by using the in-situ X-ray analysis apparatus 1 will be described in detail with reference to FIGS. 3A to 8.

Although not shown, the positive active material 43M may further include a binder or a conductive material. The binder may serve to attach particles of the positive active material 43M to one another and attach the positive active material 43M to the positive current collector 43C. The conductive material may provide electrical conductivity to the positive active material 43M.

The negative electrode 44 may include a negative current collector 44C and a negative active material 44M (or an anode active material). The negative current collector 44C may include a conductive material and may be a thin conductive mesh or a thin conductive foil. For example, the negative active material 44M may include copper, nickel, aluminum, gold, or alloys thereof. The negative active material 44M may include a material capable of reversibly intercalating/deintercalating lithium ions. The negative active material 44M may be an active material needed to analyze phase transition characteristics due to charging and discharging by the potentiostat 10 and the X-ray analysis device 20. In example embodiments, the negative active material 44M may include a carbon-based negative active material, a graphite-based negative active material, a silicon-based negative active material, a tin-based negative active material, a composite negative active material, a lithium metal negative active material, etc.

Although not shown, the negative active material 44M may further include a binder or a conductive material. The binder may serve to attach particles of the negative active material 44M to one another and attach the negative active material 44M to the negative current collector 44C. The conductive material may provide electrical conductivity to the negative active material 44M.

The separator film 45 may have porosity and may include a single film or multilayered films including two or more layers. The separator film 45 may include a polymer material and, for example, may include at least one of polyethylenebased polymer, polypropylene-based polymer, polyvinylidene fluoride-based polymer, and polyolefin-based polymer, The electrolyte (not shown) may be formed on surfaces of the positive electrode 43, the negative electrode 44, and the separator film 45. For example, a stacked structure including the positive electrode 43, the negative electrode 44, and the separator film 45 may be disposed in the cell casing 42 after being soaked in the electrolyte. The electrolyte may include a non-aqueous solvent and an electrolyte salt. The non-aqueous solvent is not particularly limited as long as it is used as a non-aqueous solvent for a conventional non-aqueous electrolyte. For example, the non-aqueous solvent may include a carbonate-based solvent, an ester-based solvent, an ether-based solvent, a ketone-based solvent, an alcohol-based solvent, or an aprotic solvent. The non-aqueous solvent may be used alone or one or more non-aqueous solvents may be mixed. When one or more of the non-aqueous solvents are mixed, the mixing ratio thereof may be appropriately adjusted according to a target performance of a battery.

According to the in-situ X-ray analysis apparatus 1 according to one or more embodiments, the electrochemical performance and the phase transition characteristics of the in-situ electrochemical cell 40 may be precisely analyzed by using the controller 30 connected to both the potentiostat 10 and the X-ray analysis device 20.

Generally, an in-situ X-ray analysis apparatus obtains information regarding the microstructure of an active material by performing X-ray diffraction analysis on an electrochemical cell for a plurality of number of times at a predetermined time interval and organizing analysis data in chronological order. However, in the case of performing X-ray diffraction analysis at regular time intervals, X-ray diffraction analysis data is obtained from an electrochemical cell including an active material having a slow reaction speed, and thus it is difficult to precisely analyze the actual microstructure of the active material.

However, according to the in-situ X-ray analysis apparatus 1 according to one or more embodiments, the controller 30 may receive information regarding capacity, voltage, current, and time from the potentiostat 10, derive a delay time based on overpotential information and diffusivity information in response to a signal based on the information, and provide a command signal to the X-ray analysis device 20 after the delay time has elapsed. Therefore, the in-situ X-ray analysis apparatus 1 may perform an X-ray diffraction analysis in a quasi-equilibrium state of the in-situ electrochemical cell 40, and thus microstructure characteristics including the crystal structure, the lattice constant, and the volume and the phase transition characteristics of the in-situ electrochemical cell 40 may be precisely analyzed.

Figure 2:
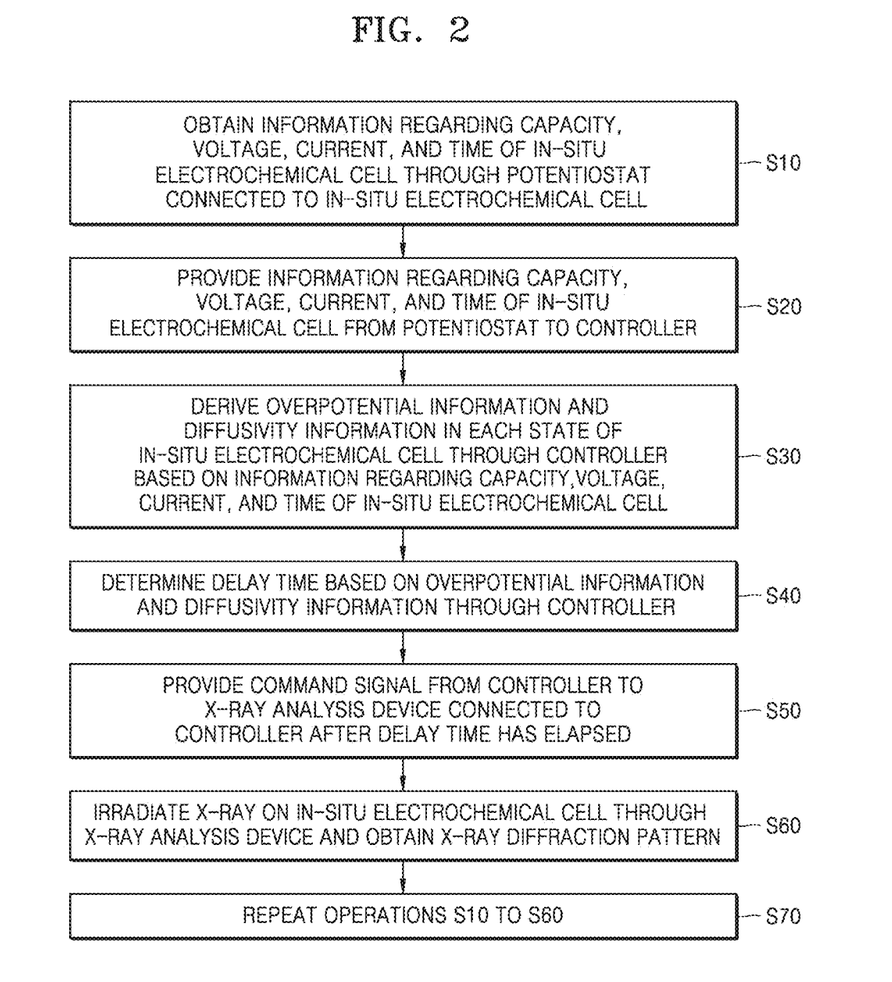
FIG. 2 is a flowchart of an in-situ X-ray analysis method according to example embodiments.

FIG. 2 is a flowchart of an in-situ X-ray analysis method according to example embodiments.

Referring to FIG. 2, information regarding capacity, voltage, current, and time of the in-situ electrochemical cell 40 may be obtained by the potentiostat 10 connected to the in-situ electrochemical cell 40 (operation S10).

In example embodiments, in operation S10, a unit charging operation or a unit discharging operation using a relatively low current density may be performed on the in-situ electrochemical cell 40 via the potentiostat 10, by using a current density input to the controller 30 in advance. For example, the in-situ electrochemical cell 40 may be prepared by using the positive active material 43M including LiMn$_x$Fe$_{1-x}$PO$_4$ and the negative active material 44M including a lithium metal, and a current may be applied to the in-situ electrochemical cell 40 for 1 hour using a current density of 0.01 C during the unit charging operation. Here, 1 C indicates a current density at which 100% charge may be completed by using a constant current density for the total mass of the positive active material 43M for a total of 1 hour, and 0.01 C indicates a current density at which 100% charge may be completed by using a constant current density for the total mass of the positive active material 43M for a total of 100 hour.

The potentiostat 10 may then provide information regarding capacity, voltage, current, and time of the in-situ electrochemical cell 40 to the controller 30 (operation S20).

In example embodiments, operation S10 for obtaining information regarding capacity, voltage, current, and time of the in-situ electrochemical cell 40 through the potentiostat 10 and operation S20 for providing the information regarding capacity, voltage, current, and time of the in-situ electrochemical cell 40 from the potentiostat 10 to the controller 30 may be performed substantially simultaneously.

In other embodiments, operation S10 for obtaining information regarding capacity, voltage, current, and time of the in-situ electrochemical cell 40 through the potentiostat 10 may be performed, and operation S20 for providing the information regarding capacity, voltage, current, and time of the in-situ electrochemical cell 40 from the potentiostat 10 to the controller 30 may be performed sequentially after a predetermined first transmission delay time. Here, the first transmission delay time may be from about 0.01 seconds to about 1 minute. For example, in operation S10, a constant current may be applied to the in-situ electrochemical cell 40 at a current density of 0.01 C and voltage information regarding the in-situ electrochemical cell 40 may be detected and recorded every 0.1 second, wherein the voltage information regarding the in-situ electrochemical cell 40 may be transmitted to the controller 30 after the first transmission delay time.

Thereafter, the controller 30 may derive overpotential information and diffusivity information in each state of the in-situ electrochemical cell 40, based on the information regarding capacity, voltage, current, and time (operation S30).

In example embodiments, the overpotential information regarding the in-situ electrochemical cell 40 may be determined by a difference between a cutoff voltage and an open-circuit voltage. For example, overpotential information may be information related to a polarization state applied to a positive electrode due to the characteristics that the lithium-ion diffusivity of the positive electrode is lower than the electronic conductivity of the positive electrode.

Also, the diffusivity information of the in-situ electrochemical cell 40 may be determined based on the following equation (1), i.e., Weppner and Huggins Equation.

$$D_{GITT} = \frac{4}{\pi}\left(\frac{mV}{MS}\right)^2\left(\frac{\Delta E_S}{\tau(dE_\tau/d\sqrt{\tau})}\right)^2; \tau \ll L^2/D_{GITT} \quad (1)$$

In equation (1), V may denote the molar volume (cm$^3$/mol) of a compound, T may denote the duration of a current pulse in seconds, and M and m may respectively denote the molecular weight (g/mol) and the mass (g) of LiMn$_x$Fe$_{1-x}$PO$_4$. Also, S may denote the area of the interface (cm$^2$) between an active material and an electrolyte, and L may denote the diffusion length (cm). $\Delta E_T$ and $\Delta E_s$ denote a voltage change after iR drop is applied and a voltage change after a hold time has elapsed, respectively.

In example embodiments, in operation S30, based on the information regarding capacity, voltage, current, and time, the controller 30 may also derive information regarding ohmic polarization in each state of the in-situ electrochemical cell 40. The ohmic polarization is related to an abrupt change in voltage at the beginning of each operation and may be information related to an iR drop in the in-situ electrochemical cell 40, for example.

Thereafter, the controller 30 may determine a delay time based on the overpotential information and the diffusivity information (operation S40).

In example embodiments, the delay time may be determined as a time until the overpotential information and the diffusivity information in each state become lower than a critical overpotential and a critical diffusivity. For example, the delay time may be determined as a time until the overpotential becomes lower than the critical overpotential. Alternatively, the delay time may be determined as a time until the diffusivity information becomes lower than the critical diffusivity.

In other embodiments, the delay time may be determined as a constant time regardless of the overpotential information and the diffusivity information in each state.

According to operation S40, the delay time may vary depending on the reaction speed of a positive active material or a negative active material of the in-situ electrochemical cell 40. For example, when the overpotential in the in-situ electrochemical cell 40 is higher than the critical overpotential, the delay time may be increased. The critical overpotential may be a value set in advance depending on the type of a positive active material or a negative active material to be analyzed.

After the delay time has elapsed, the controller 30 may provide a command signal to the X-ray analysis device 20 connected to the controller 30 (operation S50).

Thereafter, the X-ray analysis device 20 may irradiate an X-ray to the in-situ electrochemical cell 40 and obtain an X-ray diffraction pattern (operation S60). In example embodiments, an X-ray may be irradiated from the X-ray irradiation unit 22 of the X-ray analysis apparatus 20 through the at least one hole 42H provided in the casing 42 of the in-situ electrochemical cell 40, and a transmitted X-ray may be detected by the X-ray detection unit 24.

Thereafter, operations S10 to S60 may be repeated (operation S70).

For example, sequentially performing operations S10 to S60 may constitute a unit charging operation or a unit discharging operation. An in-situ X-ray analysis method according to example embodiments may include from 10 to several hundreds of unit charging operations in total and/or from 10 to several hundreds of unit discharging operations in total.

According to the above-described embodiment, as an X-ray diffraction pattern is obtained after a delay time, electrochemical data (i.e., items related to capacity or voltage) of the in-situ electrochemical cell 40 and the X-ray diffraction pattern (i.e., items related to the microstructure) may be precisely matched and analyzed.

For example, in the case of the in-situ electrochemical cell 40 using the positive active material 43M including $LiMn_xFe_{1-x}PO_4$ having a relatively low reaction speed, it may be difficult to accurately identify a microstructure by using a known method of performing X-ray diffraction analysis at constant time intervals while performing charging and discharging using a common charging/discharging device. Particularly, the positive active material 43M including $LiMn_xFe_{1-x}PO_4$ may exhibit a relatively high overpotential due to charging and discharging as compared with a common positive active material such as $LiCoO_2$, and a difference between an external voltage detected at both external terminals of the in-situ electrochemical cell 40 and an interval voltage actually applied to particles of the positive active material 43M in the in-situ electrochemical cell 40 may be significant. In such a case, when an X-ray diffraction analysis is performed by using the known method, the microstructure due to the voltage of the positive active material 43M may not be clearly matched.

On the other hand, according to the present invention, the controller 30 may derive overpotential information and diffusivity information based on information in each state, determine a delay time based on such information, and, after the delay time has elapsed, provide a command signal to an X-ray analysis device. For example, the delay time may be determined as a time until the overpotential information becomes lower than a critical overpotential. For example, the delay time may be determined as a time until a difference between the external voltage of the in-situ electrochemical cell 40 and the internal voltage applied to the positive active material 43M becomes lower than the critical overpotential, that is, a time until the difference between the external voltage of the in-situ electrochemical cell 40 and the internal voltage applied to the positive active material 43M has a significantly reduced value.

The delay time may be determined differently from one state to another (i.e., at different voltage values or at different unit charging operation or unit discharging operation). Alternatively, the delay time may be determined as the same value in each state.

Figure 3A:
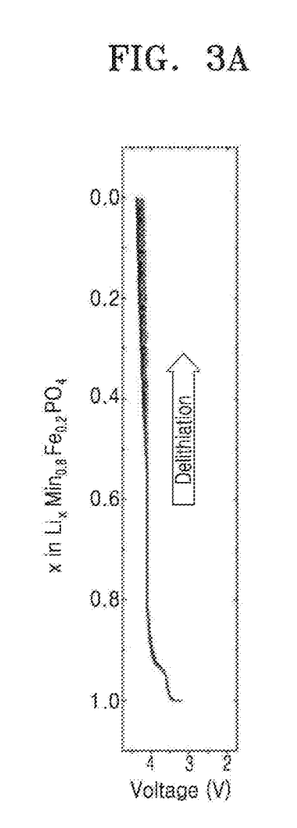
FIG. 3A shows a graph of voltage profile of an in-situ X-ray analysis method according to example embodiments.
Figure 3B:
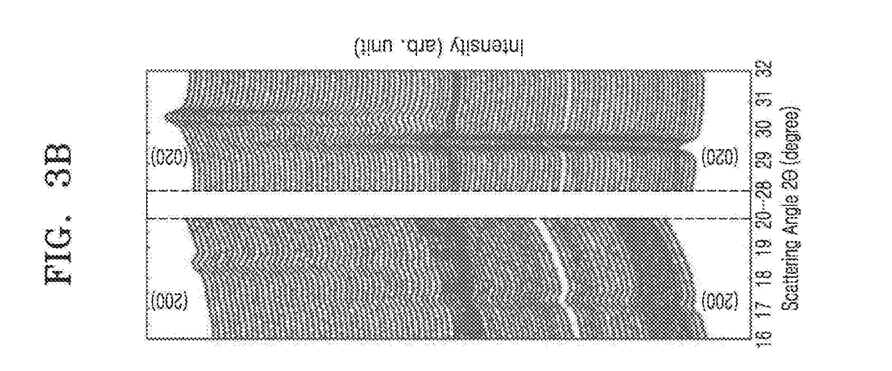
FIG. 3B shows X-ray diffraction patterns each obtained by using a unit charging operation.
Figure 3C:
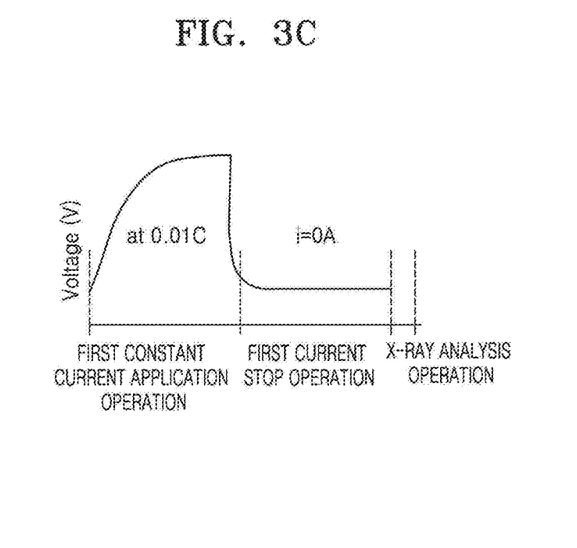
FIG. 3C shows the unit charge operation used in the in-situ X-ray analysis method according to example embodiments.

FIG. 3A shows a graph of voltage profile of an in-situ X-ray analysis method according to example embodiments, FIG. 3B shows X-ray diffraction patterns each obtained by using a unit charging operation, and FIG. 3C shows the unit charge operation used in the in-situ X-ray analysis method according to example embodiments.

Referring to FIGS. 3A to 3C, voltage profiles and X-ray diffraction patterns obtained in association with charging of a positive active material including $LiMn_{0.8}Fe_{0.2}PO_4$ using the in-situ X-ray analysis apparatus described with reference to FIG. 1 and the in-situ X-ray analysis method described with reference to FIG. 2 are shown. For example, approximately 100 unit charging operations from 3V to 4.4V were performed, and one unit charging operation included a first constant current application operation and a first current stop operation. A current was applied to an in-situ electrochemical cell at a constant current density of 0.01 C for 30 minutes in the first constant current application operation and the in-situ electrochemical cell was maintained for 30 minutes without application of a current in the first current stop operation. Open-circuit voltages were measured and recorded at regular time intervals in both the first constant current application operation and the first current stop operation. After the first current stop operation was completed, an X-ray analysis was performed through an X-ray analysis device in an X-ray analysis operation.

Figure 4A:
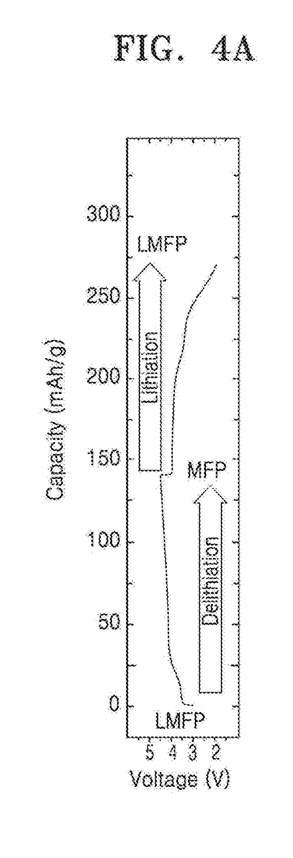
FIG. 4A shows a graph of voltage-capacity profiles obtained using an in-situ X-ray analysis method according to example embodiments and FIG. 4B shows graphs of X-ray diffraction patterns obtained using an in-situ X-ray analysis method according to example embodiments.
Figure 4B:
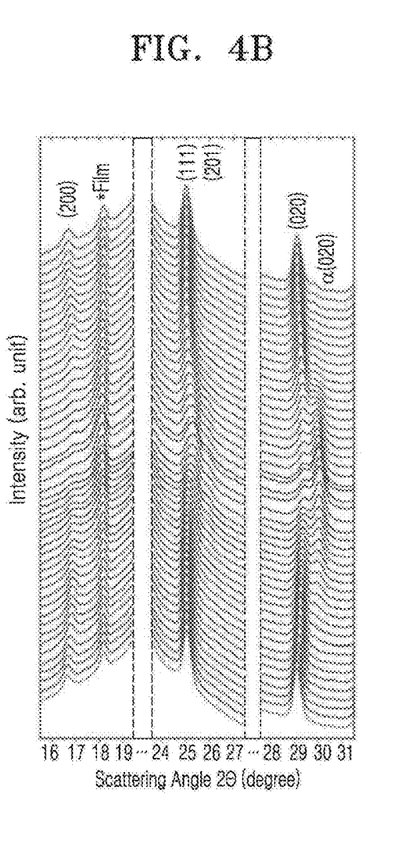
Figure 5A:
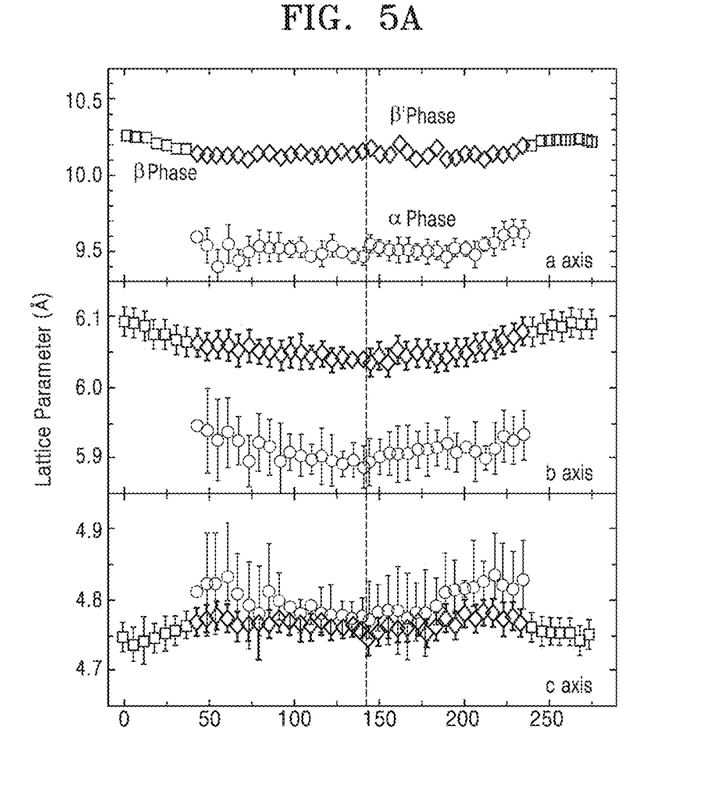
FIG. 5A shows graphs indicating lattice constants with respect to capacities obtained from the X-ray diffraction patterns of FIGS. 4A and 4B and FIG. 5B shows graphs indicating cell volume changes with respect to capacities obtained from the X-ray diffraction patterns of FIGS. 4A and 4B.
Figure 5B:
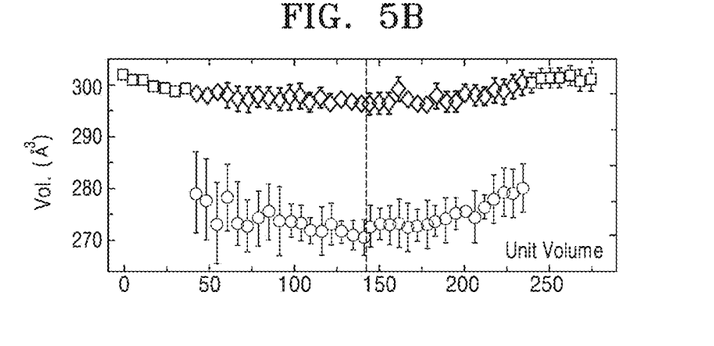

FIG. 4A shows a graph of voltage-capacity profiles obtained using an in-situ X-ray analysis method according to example embodiments and FIG. 4B shows graphs of X-ray diffraction patterns obtained using an in-situ X-ray analysis method according to example embodiments. FIG. 5A shows graphs indicating lattice constants with respect to capacities obtained from the X-ray diffraction patterns of FIGS. 4A and 4B and FIG. 5B shows graphs indicating cell volume changes with respect to capacities obtained from the X-ray diffraction patterns of FIGS. 4A and 4B.

Referring to FIGS. 4A, 4B, 5A, and 5B, an in-situ X-ray analysis method was performed during charging and discharging at an electric current density of 0.05 C using a positive active material including $LiMn_{0.8}Fe_{0.2}PO_4$.

$LiMn_{0.8}Fe_{0.2}PO_4$ is a meso crystal with an orthorhombic olivine crystal structure and is an alternative positive active material with unclear phase transition mechanism during the charging and discharging phases. Generally, a $LiMnPO_4$ positive active material exhibits a low reaction speed due to the low ionic conductivity of Mn and the decrease of phase boundary mobility due to an anisotropic lattice mismatch between a charged state and a discharged state. In the case of the $LiMn_{0.8}Fe_{0.2}PO_4$ positive active material in which the content of Mn is partially substituted with Fe, the substituted Fe may serve as a nucleation enhancer, thereby improving the electrochemical performance. However, the improved electrochemical performance and the phase transition characteristics of $Li_xMn_{0.8}Fe_{0.2}PO_4$, and the reaction mechanism based on the same still need to be clarified.

As shown in FIG. 4A, when the in-situ X-ray analysis apparatus according to example embodiments is used, $Li_xMn_{0.8}Fe_{0.2}PO_4$ exhibits a flat potential profile at 4.1 V, which may indicate a two-phase reaction section of $Mn^{2+}/Mn^{3+}$. On the other hand, the relatively inclined section at about 3.5 V may correspond to the $Fe^{2+}/Fe^{3+}$ reaction region associated with progress of a solid solution reaction.

Particularly, when charging starts from $LiMn_{0.8}Fe_{0.2}PO_4$, $LiMn_{0.8}Fe_{0.2}PO_4$ represents a β phase in a region where $0.8<x<1$, and a continuous peak shift in the X-ray diffraction graph in such a region also shows solid solution behaviors in the $Fe^{2+}/Fe^{3+}$ region. It may be confirmed that, as charging continues in such a region, deintercalation of Li ions leads to continuous contraction of an a-axis and a b-axis and continuous expansion of a c-axis. In a region where $0.2<x<0.8$, a new peak, that is, an α phase, appears from the X-ray diffraction analysis, which may indicate a two-phase reaction or a first-order transition caused by oxidation of $Mn^{2+}$. As a result, it was confirmed that the solid phase transition in the $Fe^{2+}/Fe^{3+}$ reaction region at about 3.5 V followed by a two-phase reaction region of $Mn^{2+}/Mn^{3+}$ at about 4.1 V appeared. On the other hand, according to the X-ray diffraction analysis, it was confirmed that α phase transition from the α phase ($Mn_yFe_{1-y}PO_4$) to the β phase ($LiMn_yFe_{1-y}PO_4$) appeared in the discharging operation, and a reversible structural change may occur in the $LiMn_{0.8}Fe_{0.2}PO_4$ positive active material through a charging operation and a discharging operation.

In addition, it was confirmed that an intermediate phase ($Li_yMn_yFe_{1-y}PO_4$) exists between the β phase and the α phase. This is because a solid phase is stabilized at low temperatures as Mn is substituted on a Fe sub-lattice, and a state diagram includes two miscibility gaps at low temperatures. One of the miscibility gaps is observed between the β-phase ($LiMn_yFe_{1-y}PO_4$) and a β' phase ($Li_yMn_yFe_{1-y}PO_4$) and the other one is observed between the β' phase ($Li_yMn_yFe_{1-y}PO_4$) and the α phase ($Mn_yFe_{1-y}PO_4$). Therefore, the flat potential profile appearing at about 3.55 V corresponds to a coexistence region of the β phase ($LiMn_yFe_{1-y}PO_4$) and the β' phase ($Li_yMn_yFe_{1-y}PO_4$), and the flat potential profile appearing at about 4.1 V corresponds to a coexistence region of the β' phase ($Li_yMn_yFe_{1-y}PO_4$) and the α phase ($Mn_yFe_{1-y}PO_4$).

On the other hand, the α-phase ($Mn_yFe_{1-y}PO_4$) was observed at a small intensity even in a fully discharged state, which is presumably due to incomplete reduction from $Mn^{3+}$ to $Mn^{2+}$. In other words, it may be because the reaction speed or the reaction path of $Li^+$ deintercalation in the two-phase reaction region of $Mn^{2+}/Mn^{3+}$ is different from the reaction speed or the reaction path of $Li^+$ intercalation. Phase transition characteristics related thereto will be described in more details with reference to FIGS. 6 to 8.

Figure 6:
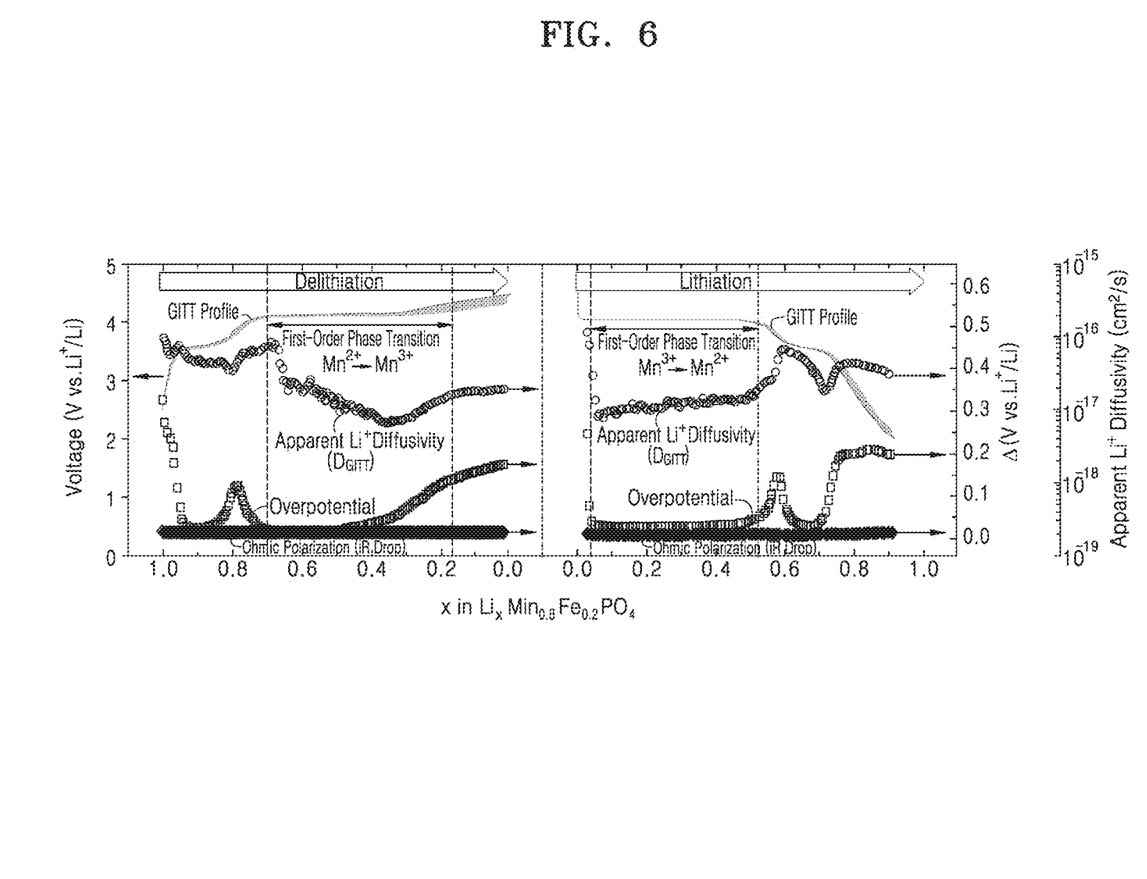
FIG. 6 shows graphs of ohmic polarization, overpotential, and diffusivity obtained using an in-situ X-ray analysis method according to example embodiments.

FIG. 6 shows graphs of ohmic polarization, overpotential, and diffusivity obtained using an in-situ X-ray analysis method according to example embodiments.

Referring to FIG. 6, the overall tendency of the overpotential may depend on a charge transfer operation and lithium ion diffusion operation, as the ohmic polarization exhibits negligible values as compared to the overpotential. The overpotential increases both at the beginning of charging and at the beginning of discharging and represents a local maximum value within a solid solution reaction region of the β' phase ($Li_yMn_yFe_{1-y}PO_4$). The local maximum value of the overpotential may be caused by a change in $Li^+$ diffusivity. The $Li^+$ diffusivity was affected by the vacancy concentration in the solid solution reaction of β' phase ($Li_yMn_yFe_{1-y}PO_4$), and formation. Migration enthalpy, and frequency showed local minimum values similar to layered oxides with solid solution reactions, thereby causing an increase in overpotential. It may be confirmed in FIG. 6 that the local maximum value of the overpotential is actually associated with the local minimum value of the $Li^+$ diffusivity. Thus, the overpotential continues to increase as the two-phase reaction progresses, which is due to the increase in the $Mn^{3+}$-rich phase portions, wherein the $Mn^{3+}$-rich phase portions may cause Jahn-Teller distortion of the structure. The Jahn-Teller distortion causes $Mn^{3+}$ to be closer to the $Li^+$ diffusion path and may cause an increase in an activation barrier for $Li^+$ migration. Also, the tendency of overpotential is reversed in the discharge operation. Moreover, the fact that the tendency of the overpotential in the two-phase reaction region are different in the charging operation and the discharging operation indicates that there are different reaction paths between them. The overpotential may be increased due to the formation of the α phase ($Mn_yFe_{1-y}PO_4$) in the charging operation, while the overpotential may be maintained constant due to the formation of the β' phase ($Li_yMn_yFe_{1-y}PO_4$) in the discharging operation. This asymmetry is due to different reaction paths between the intercalation and deintercalation of $Li^+$.

The $Li^+$ diffusivity profile shows a tendency approximately opposite to that of the overpotential profile. The $Li^+$ diffusivity in a first phase transition region may be one to two orders lower than the diffusivity in a second phase transition region, and the diffusivity decreases in the two-phase region (x ~0.9) between the β phase ($LiMn_yFe_{1-y}PO_4$) and the β' phase ($Li_yMn_yFe_{1-y}PO_4$) and the following two-phase region (x<~0.7) between the β' phase ($Li_yMn_yFe_{1-y}PO_4$) and the α phase ($Mn_yFe_{1-y}PO_4$) and then gradually increases at the end of a charged state. The increase in diffusivity at the end of the charged state may be caused by a solid solution reaction at the end of the charging operation ($Li_{~0.1}Mn_{0.8}Fe_{0.2}PO_4$). Also, the Li diffusivity value in a fully charged state is one or more order lower than that of the initial Li+diffusivity, which causes overpotential increase and is highly related to the development of Jahn-Teller $Mn^{3+}$ due to deintercalation. During the discharging operation, the $Li^+$ diffusivity tends to be approximately similar to the $Li^+$ diffusivity during the charging operation. However, it may be confirmed that the $Li^+$ diffusivity in the first phase transition region between the β' phase ($Li_yMn_yFe_{1-y}PO_4$) and the α phase ($Mn_yFe_{1-y}PO_4$) during the charging operation is clearly higher than the $Li^+$ diffusivity during the discharging operation.

Figure 7A:
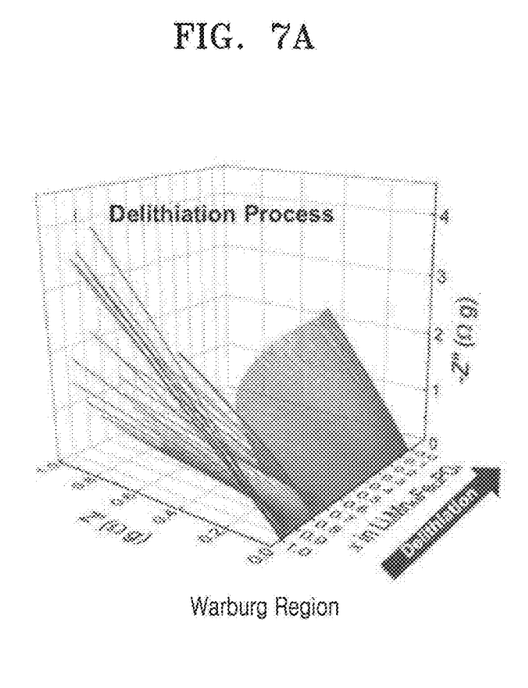
FIG. 7A shows the impedance graphs in Warburg region during a delithiation process.
Figure 7B:
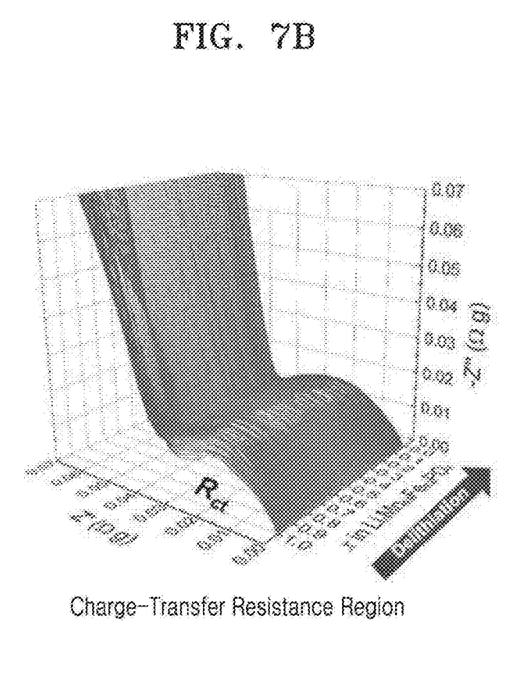
FIG. 7B shows the impedance graphs in charge-transfer resistance region during the delithiation process.
Figure 7C:
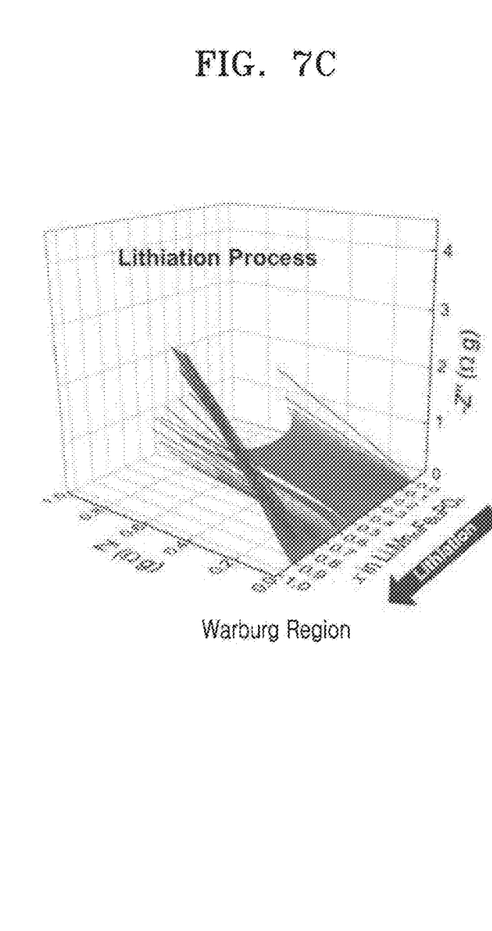
FIG. 7C shows the impedance graphs in Warburg region during a lithiation process.
Figure 7D:
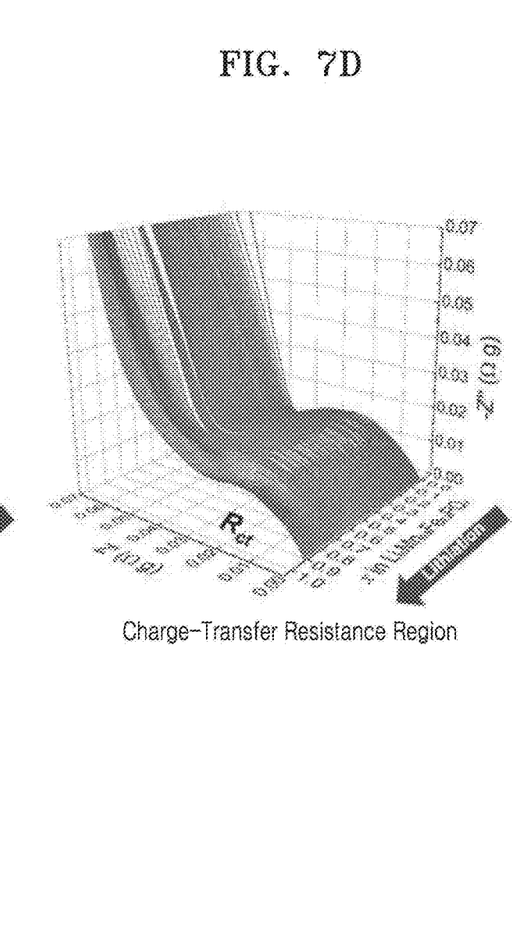
FIG. 7D shows the impedance graphs in charge-transfer resistance region during the lithiation process.
Figure 8:
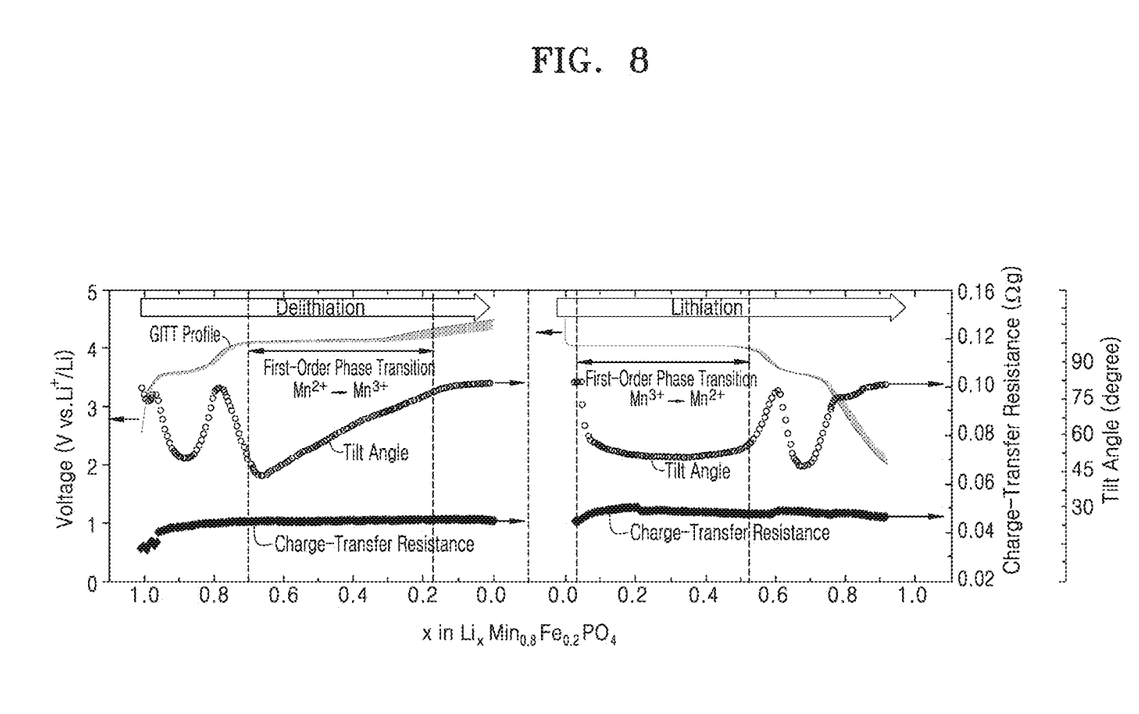
FIG. 8 shows inclination angles and charge transfer resistance graph obtained through an in-situ impedance measurement in conjunction with an in-situ X-ray analysis method according to example embodiments.

FIGS. 7A to 7D show impedance graphs obtained through an in-situ impedance measurement in conjunction with an in-situ X-ray analysis method according to example embodiments. Particularly, FIG. 7A shows the impedance graphs in Warburg region during a delithiation process, FIG. 7B shows the impedance graphs in charge-transfer resistance region during the delithiation process, FIG. 7C shows the impedance graphs in Warburg region during a lithiation process, and FIG. 7D shows the impedance graphs in charge-transfer resistance region during the lithiation process. FIG. 8 shows inclination angles and charge transfer resistance graph obtained through an in-situ impedance measurement in conjunction with an in-situ X-ray analysis method according to example embodiments.

In detail, an in-situ impedance measurement in conjunction with the in-situ X-ray analysis method described with reference to FIG. 2 was performed to analyze the mechanism of slow reduction of $Mn^{3+}$. For example, the unit charging operation or unit discharging operation described with reference to FIGS. 3A to 3C is configured to further include an in-situ impedance measurement operation. In detail, during the unit charging operation or the unit discharging operation, an in-situ impedance measurement operation followed the X-ray analysis operation.

Referring to FIGS. 7A to 7D, the impedance graph shows a charge-transfer resistance region showing a semi-circular graph in a high frequency region and a Warburg region showing a linear graph in a low frequency region. Here, the charge-transfer resistance region is caused by the resistance due to an electrode/electrolyte interface, and the Warburg region is known to be caused by the resistance of mass transfer. Here, the Warburg region may play a role in identifying the reaction path of the first phase transition region between the $\beta'$ phase ($Li_yMn_yFe_{1-y}PO_4$) and the $\alpha$ phase ($Mn_yFe_{1-y}PO_4$).

Referring to FIG. 8, inclination angles in the Warburg region shown in FIGS. 7A and 7C, that is, the linear region are separately shown. For example, the inclination angle in the first phase transition region between the $\beta'$ phase ($Li_yMn_yFe_{1-y}PO_4$) and the $\alpha$ phase ($Mn_yFe_{1-y}PO_4$) during the charging operation is different from the tendency of the inclination angle during the discharging operation. In other words, the reaction paths of the two-phase reaction in the charging operation and the discharging operation are different from each other.

In the lithiation operation, that is, the discharging operation, the inclination angle exhibits a constant value in the $Mn^{3+}$ reduction reaction region. In other words, the change of the $\beta'$ phase ($Li_yMn_yFe_{1-y}PO_4$) is not significant during the two-phase reaction. In other words, a lithiated phase may be formed on a surface during an early stage of the discharging operation, and then the shell of the lithiated phase may become thicker. Based on this, it may be anticipated that the lithiation operation follows a core-shell model. On the other hand, as the oxidation from $Mn^{2+}$ to $Mn^{3+}$ occurs in the de-lithiation operation, that is, the charging operation, the inclination angle gradually increases. It may indicate that, due to the formation of the $\alpha$-phase ($Mn_yFe_{1-y}PO_4$), the surface of the $\beta'$ phase ($Li_yMn_yFe_{1-y}PO_4$) changes continuously, which may be explained by a domino cascade or a mosaic model.

The difference between the two-phase reaction mechanisms in the charging operation and the discharging operation may be explained by the role of a nucleation enhancer. More particularly, it may be considered that Fe or Co accelerates the de-lithiation due to lower nucleation barrier and more nucleation sites. Therefore, the oxidation reaction of $Fe^{2+}$ in $LiMn_{0.8}Fe_{0.2}PO_4$ meso crystals may further improve the oxidation reaction speed of $Mn^{2+}$. On the other hand, in the lithiation operation, there is no nucleation enhancer capable of further facilitating the reduction reaction of $Mn^{3+}$. Therefore, it may be confirmed that the reaction speeds in the charging operation and the discharging operation are different due to the difference, and that the de-lithiation operation is more electrochemically efficient than the lithiation operation.

As described in detail with reference to FIGS. 3A to 8, the in-situ X-ray analysis apparatus and the in-situ X-ray analysis method according to the present invention may be used to clearly match the reaction speed and the phase transition characteristics of an olivine-based $LiMn_{0.8}Fe_{0.2}PO_4$ mesocystal positive active material, and thus various approaches for performance improvement and commercialization of an olivine-based positive active materials may be derived.

An in-situ X-ray analysis apparatus according to one or more embodiments may include a potentiostat connected to an in-situ electrochemical cell and adjusts voltage and current of an in-situ electrochemical cell, an X-ray analysis device configured to obtain X-ray diffraction information regarding the in-situ electrochemical cell, and a controller connected to the X-ray analysis device and the potentiostat and configured to provide or receive signals to or from the X-ray analysis device and the potentiostat. The controller may determine a delay time according to overpotential information and diffusivity information in each state regarding the electrochemical cell and provide a command signal to the X-ray analysis device after the delay time has elapsed. Therefore, the phase transition characteristics of an electrochemical cell may be precisely analyzed in consideration of the lithium ion reaction speed in the in-situ electrochemical cell.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

We claim:

1. An in-situ X-ray analysis apparatus comprising:
   a potentiostat connected to an in-situ electrochemical cell and configured to:
     adjust voltage, current, and time of the in-situ electrochemical cell or
     record information regarding voltage, current, resistance, capacity, and time information of the in-situ electrochemical cell;
   an X-ray analysis device configured to obtain X-ray diffraction information regarding the in-situ electrochemical cell; and
   a controller connected to the X-ray analysis device and the potentiostat and configured to provide or receive signals to or from the X-ray analysis device and the potentiostat,
   wherein the potentiostat is configured to provide the information regarding capacity, voltage, current, and time of the in-situ electrochemical cell to the controller, and
   wherein the controller is further configured to:
     provide a command signal for the X-ray analysis device to irradiate an X-ray to the in-situ electrochemical cell in response to a signal based on the information provided by the potentiostat, derive overpotential information or diffusivity information in each state based on the information regarding capacity, voltage, current, and time of the in-situ electrochemical cell, and determine a delay time after which a command signal is provided to the X-ray analysis device according to the overpotential information or the diffusivity information.

2. The in-situ X-ray analysis apparatus of claim 1, wherein the overpotential information is determined by a difference between a cutoff voltage of the in-situ electrochemical cell and an open-circuit voltage of the in-situ electrochemical cell.

3. The in-situ X-ray analysis apparatus of claim 1, wherein the delay time is determined as a time until the overpotential information in each state become lower than critical overpotential.

4. The in-situ X-ray analysis apparatus of claim 1, wherein the delay time is determined as a time until the diffusivity information in each state become lower than critical diffusivity.

5. The in-situ X-ray analysis apparatus of claim 1, wherein the X-ray analysis device is a transmission type X-ray analysis apparatus.

6. The in-situ X-ray analysis apparatus of claim 1, wherein the in-situ electrochemical cell comprises:
a cell casing having a plurality of holes capable of transmitting an X-ray irradiated from the X-ray analysis device therethrough into the in-situ electrochemical cell;
a positive electrode provided in the cell casing;
a negative electrode provided in the cell casing;
a separator film interposed between the positive electrode and the negative electrode; and
an electrolyte in which at least surfaces of the positive electrode, the negative electrode, and the separator film are soaked.

7. An in-situ X-ray analysis method comprising:
obtaining information regarding capacity, voltage, current, and time of an in-situ electrochemical cell through a potentiostat connected to the in-situ electrochemical cell;
providing the information regarding capacity, voltage, current, and time of the in-situ electrochemical cell from the potentiostat to a controller;
deriving, by the controller, overpotential information and diffusivity information in each state of the in-situ electrochemical cell, based on the information regarding capacity, voltage, current, and time;
determining, by the controller, a delay time based on the overpotential information and the diffusivity information;
providing a command signal to an X-ray analysis device connected to the controller from the controller after the delay time has elapsed; and
irradiating, by the X-ray analysis device, an X-ray to the in-situ electrochemical cell to obtain an X-ray diffraction pattern.

8. The in-situ X-ray analysis method of claim 7, wherein the delay time is determined as a time until the overpotential information and the diffusivity information in each state become lower than critical overpotential and critical diffusivity.

9. The in-situ X-ray analysis method of claim 7, wherein the delay time is determined as a constant value regardless of the overpotential information and the diffusivity information.

10. The in-situ X-ray analysis method of claim 7, wherein the in-situ electrochemical cell comprises a cathode active material containing $LiMn_xFe_{1-x}PO_4$.

* * * * *